United States Patent
Ly et al.

(10) Patent No.: US 10,735,078 B2
(45) Date of Patent: Aug. 4, 2020

(54) OPERATIONS WITH BANDWIDTH PART (BWP) SWITCHING

(71) Applicant: QUALCOMM Incorporated, San Diego, CA (US)

(72) Inventors: Hung Dinh Ly, San Diego, CA (US); Tao Luo, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/246,228

(22) Filed: Jan. 11, 2019

(65) Prior Publication Data

US 2019/0222290 A1    Jul. 18, 2019

Related U.S. Application Data

(60) Provisional application No. 62/616,822, filed on Jan. 12, 2018.

(51) Int. Cl.
   *H04B 7/06* (2006.01)
   *H04L 5/00* (2006.01)
   (Continued)

(52) U.S. Cl.
   CPC .......... *H04B 7/0695* (2013.01); *H04B 7/088* (2013.01); *H04L 5/0048* (2013.01);
   (Continued)

(58) Field of Classification Search
   CPC .......... H04W 72/042; H04W 74/0833; H04W 76/19; H04W 72/046; H04W 72/0453;
   (Continued)

(56) References Cited

U.S. PATENT DOCUMENTS

| 2019/0166555 A1* | 5/2019 | Cheng | H04W 72/0446 |
| 2019/0289513 A1* | 9/2019 | Jeon | H04W 52/40 |

FOREIGN PATENT DOCUMENTS

| WO | WO-2018232090 A1 | 12/2018 |
| WO | WO-2019032882 A1 | 2/2019 |

OTHER PUBLICATIONS

Huawei., et al., "Offline Discussion for BWP", 3GPP Draft; R2-1714182_Offline Discussion on BWP, 3rd Generation Partnership Project (3GPP), Mobile Competence Centre, 650, Route Des Lucioles; F-06921 Sophia-Antipolis Cedex, France, vol. RAN WG2, No. Reno, USA, Nov. 27, 2017-Dec. 1, 2017, Dec. 4, 2017 (Dec. 4, 2017), pp. 1-11, XP051372814, Retrieved from the Internet: URL: http://www.3gpp.org/ftp/tsg_ran/WG2_RL2/TSGR2_100/Docs/ [retrieved on Dec. 4, 2017], Section 1.Introduction.

(Continued)

*Primary Examiner* — Leila Malek
(74) *Attorney, Agent, or Firm* — Patterson & Sheridan, L.L.P

(57) ABSTRACT

Certain aspects of the present disclosure provide techniques and apparatus for operations with switching active bandwidth parts (BWPs), such as for radio link monitoring (RLM), beam failure recovery, random access, and/or other operations. As described herein, a UE may be configured with one or more sets of BWPs. The UE may determine/select the uplink and/or downlink BWP to use. For example, the UE can determine to use an active BWP or to switch to another BWP. The UE may use the BWP during operations, such as RLM, beam failure recovery, and/or random access, etc. for monitoring on the downlink and/or for transmitting on the uplink.

26 Claims, 13 Drawing Sheets

(51) Int. Cl.
    *H04W 76/28*   (2018.01)
    *H04B 7/08*    (2006.01)
    *H04W 74/08*   (2009.01)

(52) U.S. Cl.
    CPC .......... *H04L 5/0094* (2013.01); *H04L 5/0098* (2013.01); *H04W 74/0833* (2013.01); *H04W 76/28* (2018.02); *H04L 5/001* (2013.01); *H04L 5/0007* (2013.01)

(58) Field of Classification Search
    CPC ............... H04W 76/28; H04W 36/305; H04W 72/1289; H04B 7/06; H04B 7/0413
    USPC ......................................................... 375/262
    See application file for complete search history.

(56) References Cited

OTHER PUBLICATIONS

International Search Report and Written Opinion—PCT/US2019/013396—ISA/EPO—dated Apr. 10, 2019.

LG Electronics: "Discussion on Radio Link Monitoring in NR", 3GPP Draft; R1-1713134_Radio Link Monitoring, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Aug. 21, 2017-Aug. 25, 2017, Aug. 20, 2017 (Aug. 20, 2017), 6 Pages, XP051315943, Retrieved from the Internet: URL: http://www.3gpp.org/ftp/Meetings_3GPP_SYNC/RAN1/Docs/ [retrieved on Aug. 20, 2017].

LG Electronics: "Remaining Issues on Bandwidth Parts", 3GPP Draft; R1-1719935_Remaining Issues on Bandwidth Parts _Final, 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 18, 2017 (Nov. 18, 2017), pp. 1-7, XP051369648, Retrieved from the Internet: URL: http://www.3gpp.org/ftp/tsg_ran/WG1_RL1/TSGR1_91/Docs/ [retrieved on Nov. 18, 2017], Section 1, 2.3 and 2.4.

* cited by examiner

OPERATIONS WITH BANDWIDTH PART (BWP) SWITCHING

CROSS-REFERENCE TO RELATED APPLICATION & PRIORITY CLAIM

This application claims benefit of and priority to U.S. Provisional Patent Application Ser. No. 62/616,822, filed Jan. 12, 2018, herein incorporated by reference in its entirety as if fully set forth below and for all applicable purposes.

BACKGROUND

Field of the Disclosure

Aspects of the present disclosure relate to wireless communications, and more particularly, to techniques for switching active bandwidth parts (BWPs) for operations, for example, for radio link monitoring (RLM), beam failure recovery, radio resource management (RRM), random access, or other operations.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for performing switching active bandwidth parts (BWPs) selected by a user equipment (UE), for example, based, at least in part, on an operating conditions (e.g., operating mode of the UE). Certain aspects relate to, in certain scenarios, performing radio link monitoring (RLM) or beam failure recovery using configured, active, BWPs that include a channel state information reference signal (CSI-RS) transmission or other transmission.

Certain aspects of the present disclosure provide a method for wireless communication that may be performed, for example, by a UE. The method generally includes receiving, from a transmit/receive point (TRP), a configuration of a set of BWPs for the UE. The method includes determining, for a beam failure recovery procedure, to use an active BWP of the set of BWPs or to switch to another BWP of the set of BWPs. The method includes monitoring and/or transmitting on the determined BWP during the beam failure recovery procedure based on the determination.

Certain aspects of the present disclosure provide an apparatus for wireless communication. The apparatus generally includes means for receiving, from a TRP, a configuration of a set of BWPs for the UE. The apparatus includes means for determining, for a beam failure recovery procedure, to use an active BWP of the set of BWPs or to switch to another BWP of the set of BWPs. The apparatus includes means for monitoring and/or transmitting on the determined BWP during the beam failure recovery procedure based on the determination.

Certain aspects of the present disclosure provide an apparatus for wireless communication. The apparatus generally includes a receiver configured to receive, from a TRP, a configuration of a set of BWPs for the UE. The apparatus includes at least one processor coupled with a memory and configured to determine, for a beam failure recovery procedure, to use an active BWP of the set of BWPs or to switch to another BWP of the set of BWPs. The apparatus includes a transceiver configured to monitor and/or transmit on the determined BWP during the beam failure recovery procedure based on the determination.

Certain aspects of the present disclosure provide a computer readable medium having computer executable code stored thereon for wireless communication. The computer readable medium generally includes code for receiving, from a TRP, a configuration of a set of BWPs for the UE. The computer readable medium includes code for determining, for a beam failure recovery procedure, to use an active BWP of the set of BWPs or to switch to another BWP of the set of BWPs. The computer readable medium includes code for monitoring and/or transmitting on the determined BWP during the beam failure recovery procedure based on the determination.

Certain aspects of the present disclosure provide another method for wireless communication that may be performed, for example, by a UE. The method generally includes receiving, from a TRP, a first configuration including a first set of one or more active BWPs for the UE to monitor while operating in a first mode. The method generally includes receiving, from the TRP, a second configuration including a second set of one or more active BWPs for the UE to monitor while operating in a second mode. The method generally includes determining an operating mode of the UE. The operating mode includes one of the first mode or the second mode. The second mode is a reduced power mode as compared to the first mode. The method generally includes monitoring one of the first set of one or more active BWPs or the second set of one or more active BWPs based, at least in part, on the determined operating mode.

Certain aspects of the present disclosure provide a method for wireless communication that may be performed, for example, by a TRP. The method generally includes transmitting, to a UE, a first configuration including a first set of one or more active BWPs for the UE to monitor while operating in a first mode. The method generally includes transmitting, to the UE, a second configuration including a second set of one or more active BWPs for the UE to monitor while operating in a second mode. The method generally includes determining an operating mode of the UE. The operating mode includes one of the first mode or the second mode. The second mode is a reduced power mode as compared to the first mode. The method generally includes transmitting using one of the first set of one or more active BWPs or the second set of one or more active BWPs based, at least in part, on the determined operating mode.

Certain aspects of the present disclosure provide a method for wireless communication that may be performed, for example, by a UE. The method generally includes receiving, from a TRP, a first configuration of one or more BWPs to monitor. The first configuration has one or more BWPs that include a synchronization signal (SS) and not a RS. The method generally includes monitoring the SS associated with the first configuration of one or more BWPs. The method generally includes determining a number of out of sync (OOS) indications associated with the monitored SS is greater than a threshold value. The method generally includes switching from monitoring an SS associated with the first configuration of one or more BWPs to monitoring a RS associated with a different configuration of BWPs.

Certain aspects of the present disclosure provide a method for wireless communication that may be performed, for example, by a TRP. The method generally includes transmitting, to a UE, a first configuration of one or more BWPs to monitor. The first configuration comprises one or more BWPs that include a SS and not a RS. The method generally includes transmitting, to the UE, an indication of when to switch from monitoring the SS associated with the first configuration of one or more BWPs to monitoring a RS.

Aspects include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
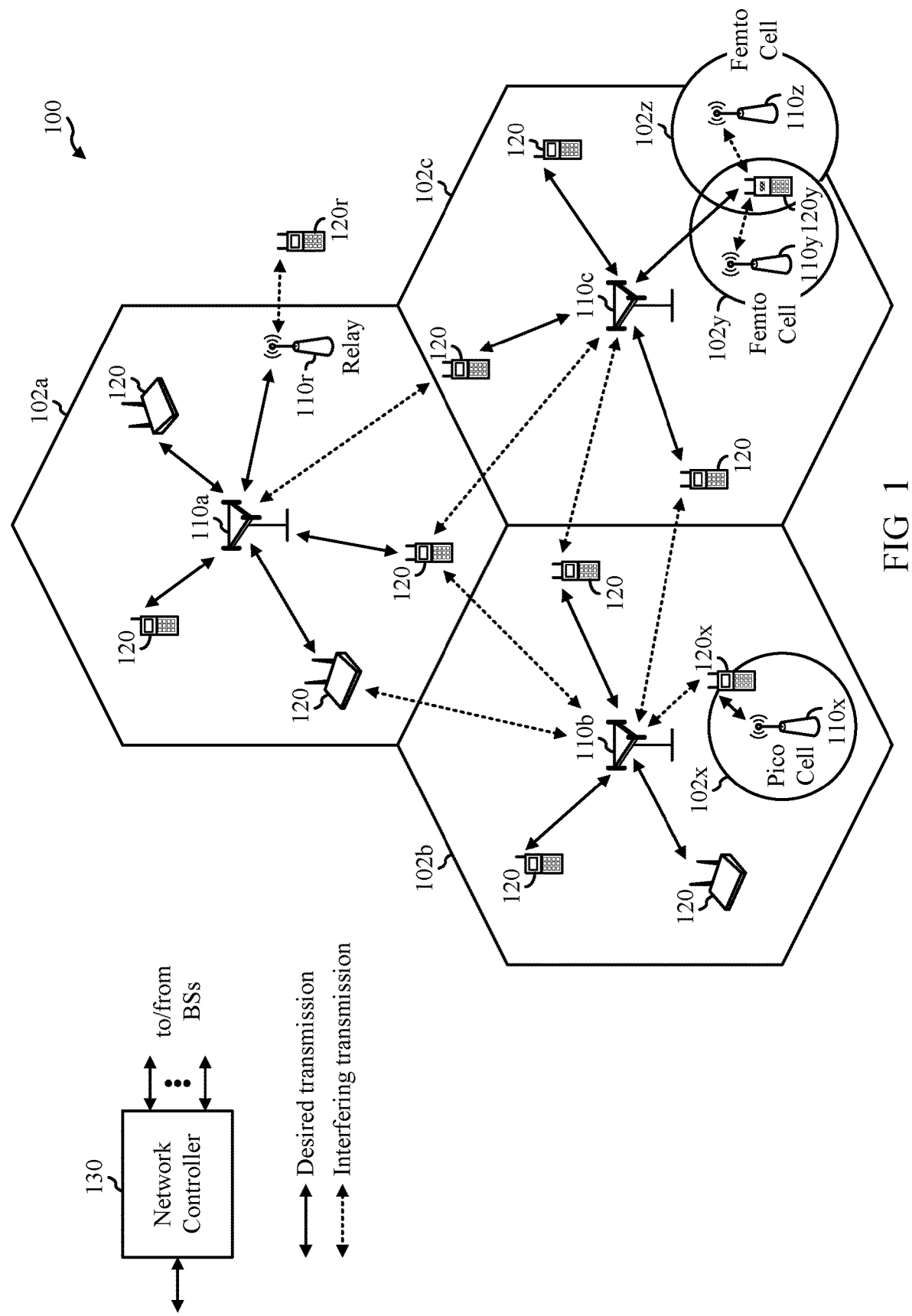
FIG. 1 is a block diagram conceptually illustrating an example telecommunications system, in accordance with certain aspects of the present disclosure.

Aspects of the present disclosure provide techniques and apparatus for using bandwidth parts (BWPs). NR provides a mechanism to adaptively adjust a UE's operating bandwidth via introduction of BWPs. For illustrative purposes, a user equipment (UE) may be allocated a subset or part of the total BW. BWPs may include downlink BWPs and uplink BWPs. Communication between the UE and a transmit/receive point (TRPs) occur using active BWPs. The UE may not be required to transmit or receive outside of the configured frequency range of the active BWP. The concept of active BWP improves energy efficiency.

In NR, it has been agreed that a UE is not required to perform radio link management (RLM) outside the active DL BWP. The downlink radio link quality (for RLM purposes) of the primary cell is monitored by a UE for the purpose of indicating out-of-sync/in-sync status to higher layers. In some examples, the UE is not required to monitor the downlink radio link quality in DL BWPs other than the activated DL BWP on the primary cell.

In certain scenarios, an active BWP may not contain a synchronization signal (SS). Given that a UE is not required to perform RLM outside of the active DL BWP, the network may need to configure a reference signal (e.g., CSI-RS) for transmission on the active BWP for the UE to perform RLM, which, as described in more detail below, is resource inefficient.

In certain scenarios, the active BWP contains an SS and may not contain an RS. Due to lower beamforming gains of the SS as compared to the RS, a UE may observe downlink link quality issues by monitoring an SS that it may not have observed if the UE had monitored an RS in the BWP.

Aspects of the present disclosure provide methods and apparatus for switching active BWPs, for example, to address these scenarios and others, thereby improving operations, such RLM operations and/or beam failure recovery operations using active BWPs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be implemented. For example, the wireless network may be a new radio (NR) or 5G network. As will be described in more detail herein, a UE 120 in the wireless communication network 100 may be configured with one or more sets of active BWPs. The UE 120 may select one or more BWPs for DL monitoring and UL transmissions, for example, the UE 120 can switch to a different active BWP for certain operations, based on operating conditions. According to another example, a UE 120 may switch from monitoring a BWP including a synchronization signal, such as NR-SS, and not including an RS to monitoring a different BWP including NR-SS and an RS or to monitoring a different BWP including RS and no NR-SS. As described herein, due to lower beamforming gains associated with NR-SS transmissions as compared with an RS (such as a CSI-RS), the UE may observe reduced cell coverage by monitoring the NR-SS and not the CSI-RS.

UEs 120 may be configured to perform the operations 900 and 1100 and other methods described herein and discussed in more detail below regarding RLM operation using active BWPs. BS 110 may comprise a transmission reception point (TRP), Node B (NB), gNB, access point (AP), new radio (NR) BS, gNodeB, 5GNB, etc.). The NR network 100 may include the central unit. The BS 110 may perform complementary operations to the operations performed by the UE.

The BS 110 may perform the operations 1000 and 1200 and other methods described herein regarding operations using BWPs.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
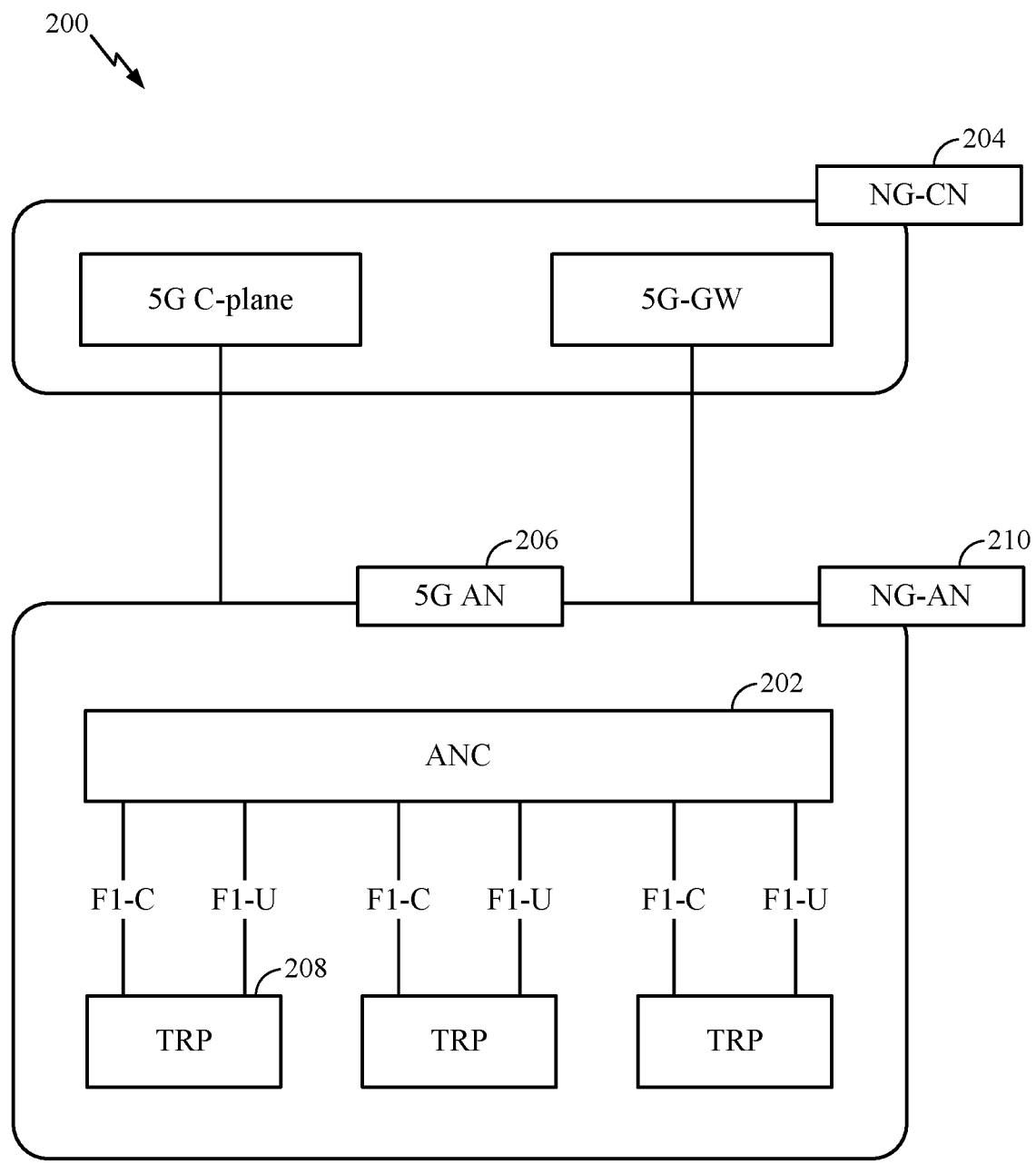
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
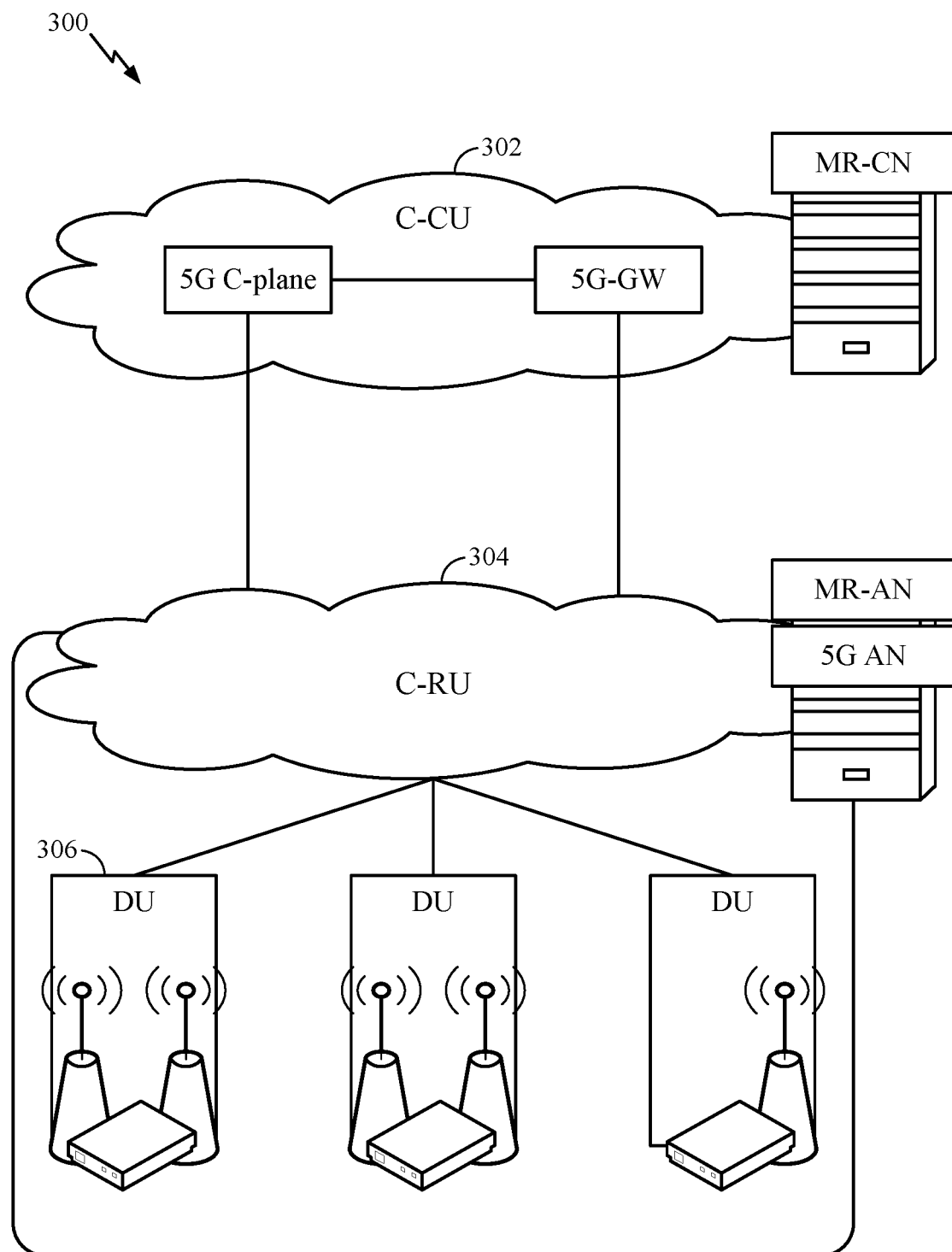
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
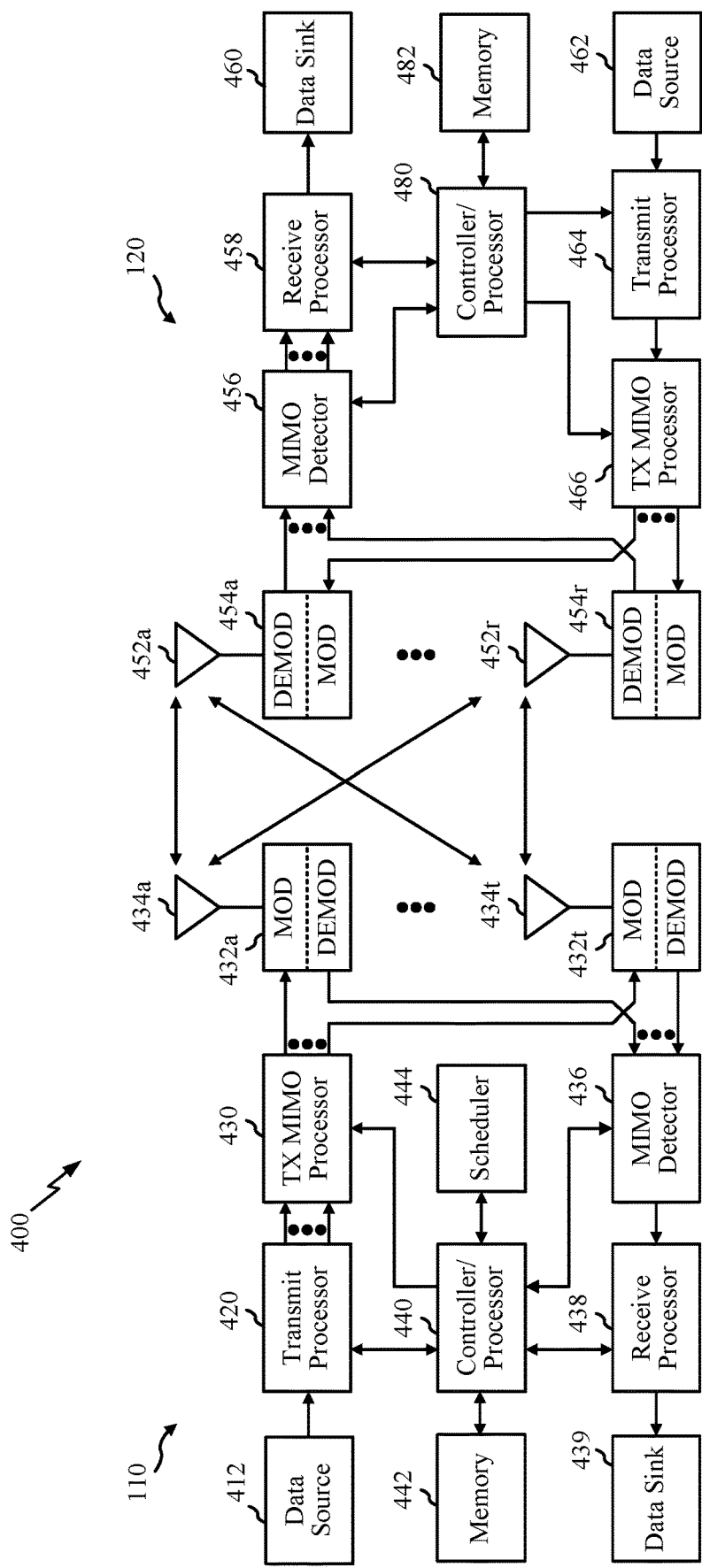
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein and illustrated with reference to FIGS. 8-12.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
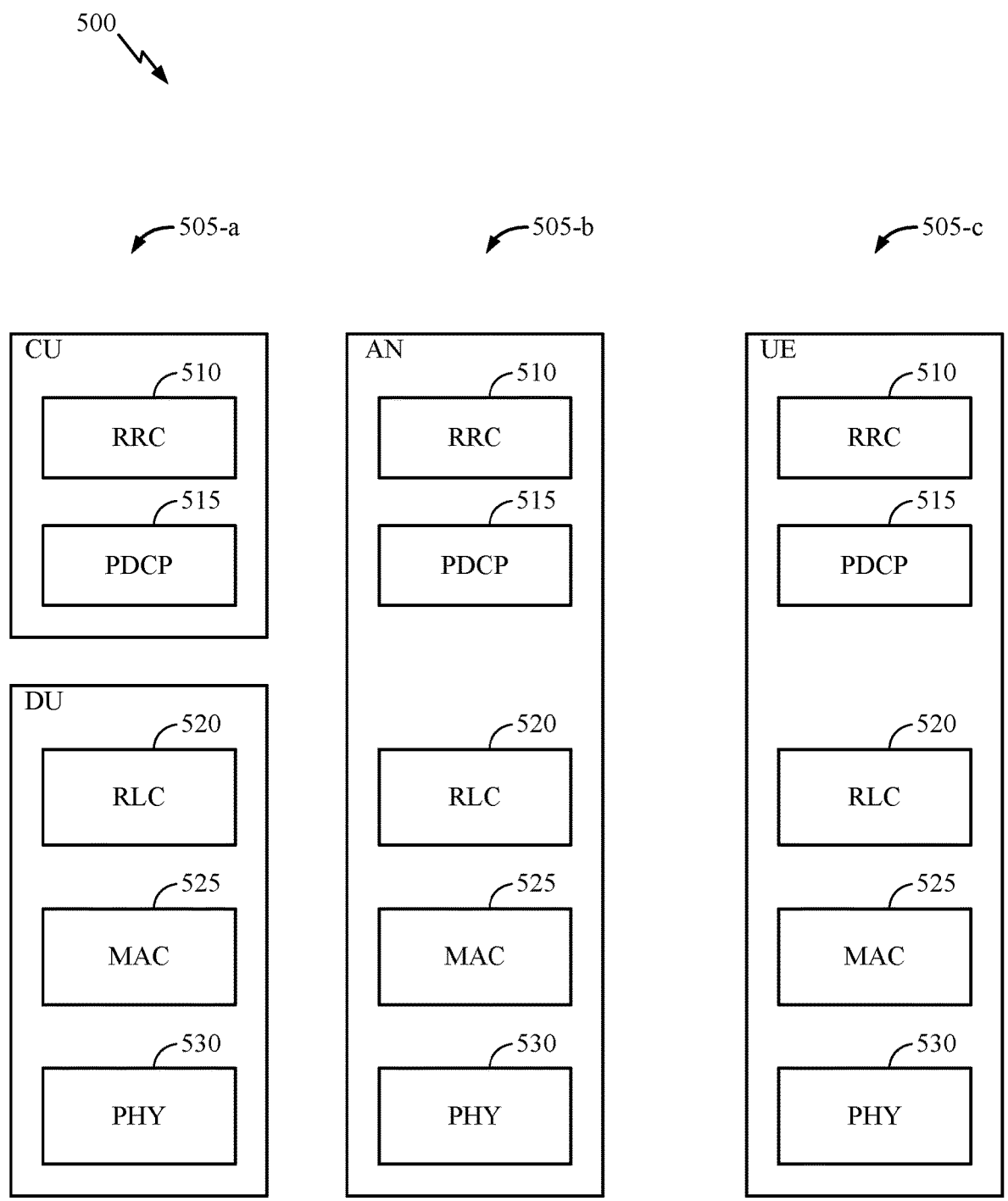
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
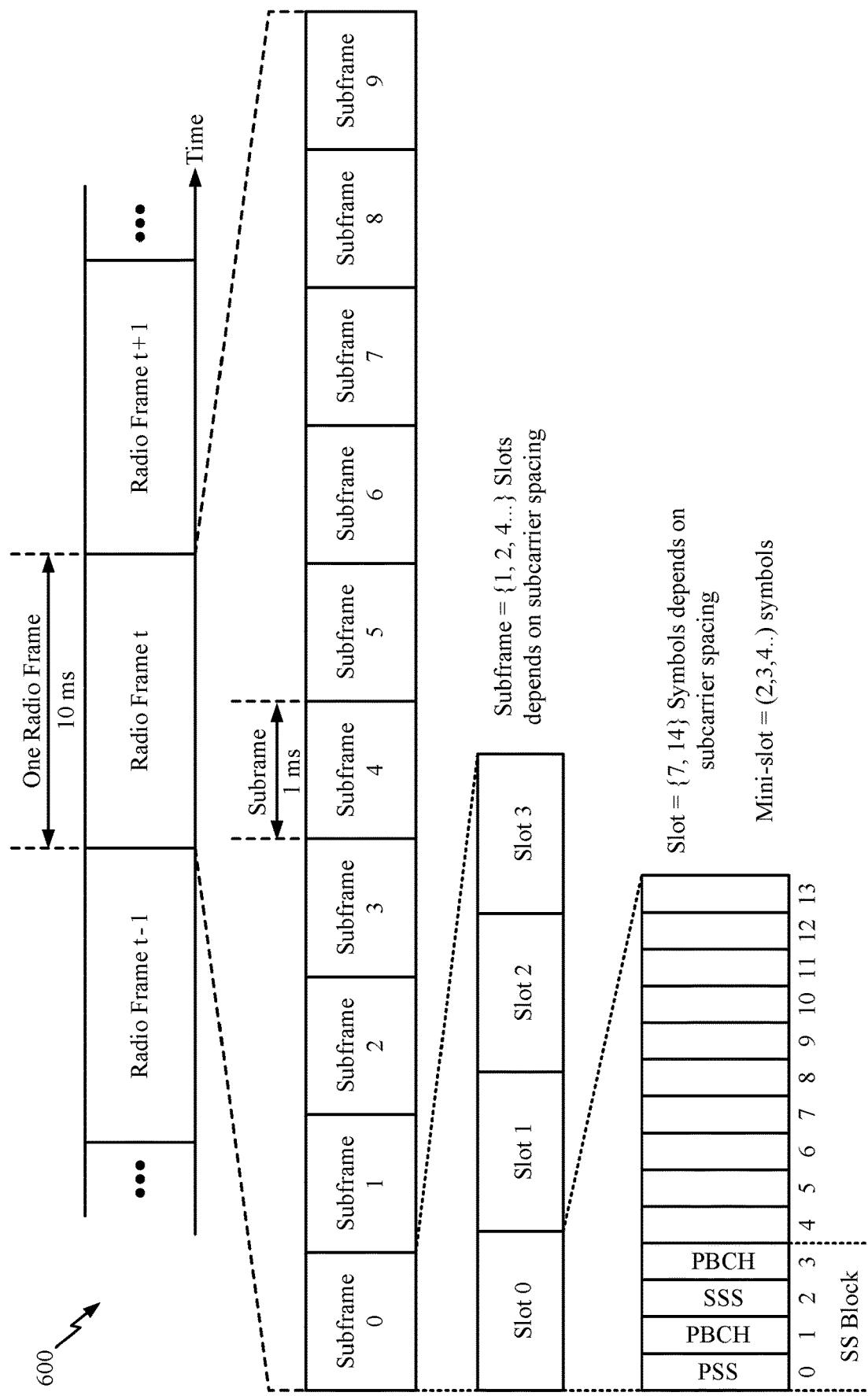
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Operations With Bandwidth Part (BWP) Switching

It has been agreed in new radio (e.g., 5G NR) that a user equipment (UE) is not required to perform radio link monitoring (RLM) measurements outside an active downlink (DL) bandwidth part (BWP). Specifically, the downlink radio link quality (e.g., for RLM operations) of the primary cell may be monitored by a UE. The UE indicates out-of-sync (OOS) or in-sync status to higher layers based on the monitored radio link quality. The UE may not be required to monitor the downlink radio link quality in DL BWPs other than the activated DL BWP on the primary cell.

As an example, the network (e.g., a transmit/receive point (TRP)) may configure a UE with four BWPs, out of which only one of the four BWPs is active at a given time. The UE monitors the downlink radio link quality on the active DL BWP and transmits an in-synch or OOS status to higher layers. The UE determines the status based on the monitoring of one or more signals transmitted by the network using the activated DL BWP.

Because the UE is not required to perform RLM measurements outside of its active BWP, an issue may arise when the active BWP does not contain a synchronization signal (e.g., NR-SS). As an example, a group of UE are configured a certain active BWP, meaning there is a frequency region which is active for that group of UEs. If an SS is not configured for that frequency region (BWP), then the network may have to configure one or more RS (e.g., channel state information RS (CSI-RS)) in the active BWP for the UEs in that BWP to use for RLM purposes.

Further, when a UE transitions to a low-power state and the configured active BWP does not include an SS transmission, then the network may still transmit the RS, even though the UE is in the low-power state. In an example, a UE may be in an active mode and move from the active mode (e.g., a non-low-power mode) to a lower-power mode. In some examples, the active mode may be a non-discontinuous reception (DRX) mode and the lower-power mode may be a connected discontinuous reception (C-DRX) mode. In the lower-power mode, the UE may wake up at every DRX "on" duration to monitor the RS. As described above, the network transmits an RS that the UE can use for RLM purposes when an SS is not included (e.g., not transmitted) in the UE's active BWP.

Transmitting the RSs, such as CSI-RS, while the UE is operating in the low-power state is resource inefficient and negatively impacts system throughput because portions of the limited spectrum are being used for UEs in the low-power state that are not actively receiving any data.

In some cases, SS and RS transmissions have different characteristics. A group of UEs may be configured with active BWP(s) that contains an SS (e.g., NR-SS) and do not contain an RS (e.g., CSI-RS). The NR-SS may be configured as part of the RLM RS resources, where the RLM RS resources include NR-SS and not CSI-RS. As described below, due to lower beamforming gains of NR-SS, the UE may observe downlink radio link quality issues earlier than if CSI-RS were configured as part of the RLM RS resources.

Figure 7:
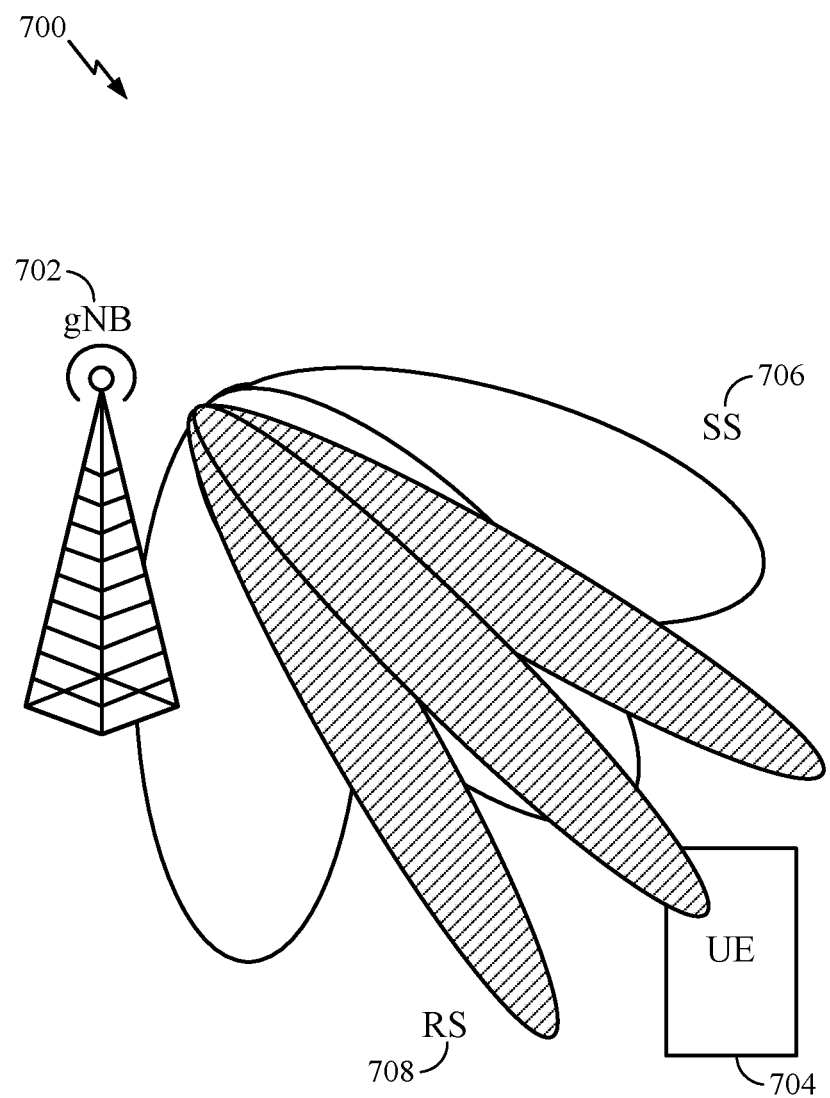
FIG. 7 illustrates an example of NR synchronization signal (NR-SS) and channel state information RS (CSI-RS) transmissions, in accordance with certain aspects of the present disclosure.

FIG. 7 illustrates an example 700 of beamformed communication. A TRP (e.g., a next generation NodeB (gNB), base station (BS), etc.) 702 communicates with a UE 704 using active beams and active BWPs. The TRP transmits an SS, such as an NR-SS using beams 706. The NR-SS may include NR-primary synchronization signal (NR-PSS), NR-secondary synchronization signal (NR-SSS), and demodulation reference signal (DM-RS). The TRP transmits reference signals, such as CSI-RS using beams 708. As illustrated in FIG. 7, the lower beamforming gain of the NR-SS effectively shrinks the cell coverage for the UE. Therefore, when monitoring NR-SS only, the UE may observe radio link issues earlier as compared to if the UE was configured to monitor CSI-RS.

Accordingly, aspects of the present disclosure provide techniques and apparatus for operations with BWP switching, such as for RLM, beam failure recovery, radio resource management (RRM), random access, and/or other operations.

According to certain aspects, a UE is configured with a set (e.g., one or more) of BWPs. The UE may receive the configuration from a TRP. The configured set of BWPs may include any combination of UL and DL BWPs.

According to certain aspects, among the configured BWPs, the UE is indicated a set of active BWPs for a first operating conditions (e.g., mode of operation) and another set of BWPs for second operating conditions (e.g., mode of operation).

In some examples, the first operating conditions may be a higher power mode of operations, such as non-DRX mode, and the second mode operating conditions may be a reduced power mode compared to the first mode, such as a C-DRX mode. For example, a UE may be configured with BWPs 1, 2, 3, and 4. At any given time, one or more of BWPs 1, 2, 3, and 4 may be active. The UE may receive an indication from the network, via a TRP, that the BWPs 1 and 2 are active for a first mode of operation and that BWPs 3 and 4 are active for a second mode of operation. The UE may also receive an indication of active UL BWPs for each of the first and second modes of operation. The UE may determine its operating conditions and use the corresponding DL and UL BWPs.

Certain aspects provided herein for a UE switching BWPs based on operation conditions are discussed for purposes of RLM; however, a UE may apply similar techniques for switching BWPs based on operating conditions for beam failure recovery operations, connected mode mobility (e.g., radio resource management (RRM)), random access, and the like.

Figure 8:
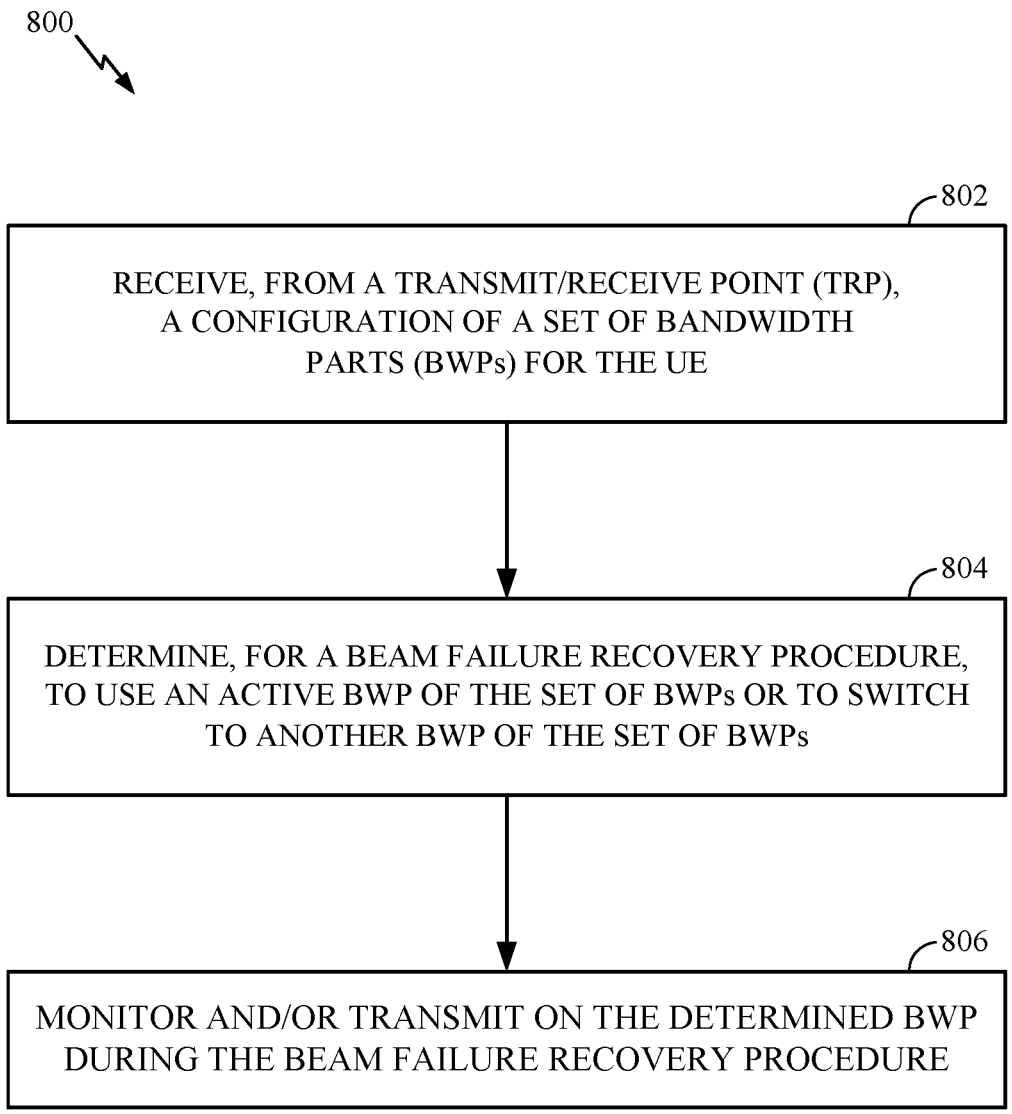
FIG. 8 illustrates example operations performed by a UE, in accordance with certain aspects of the present disclosure.
Figure 9:
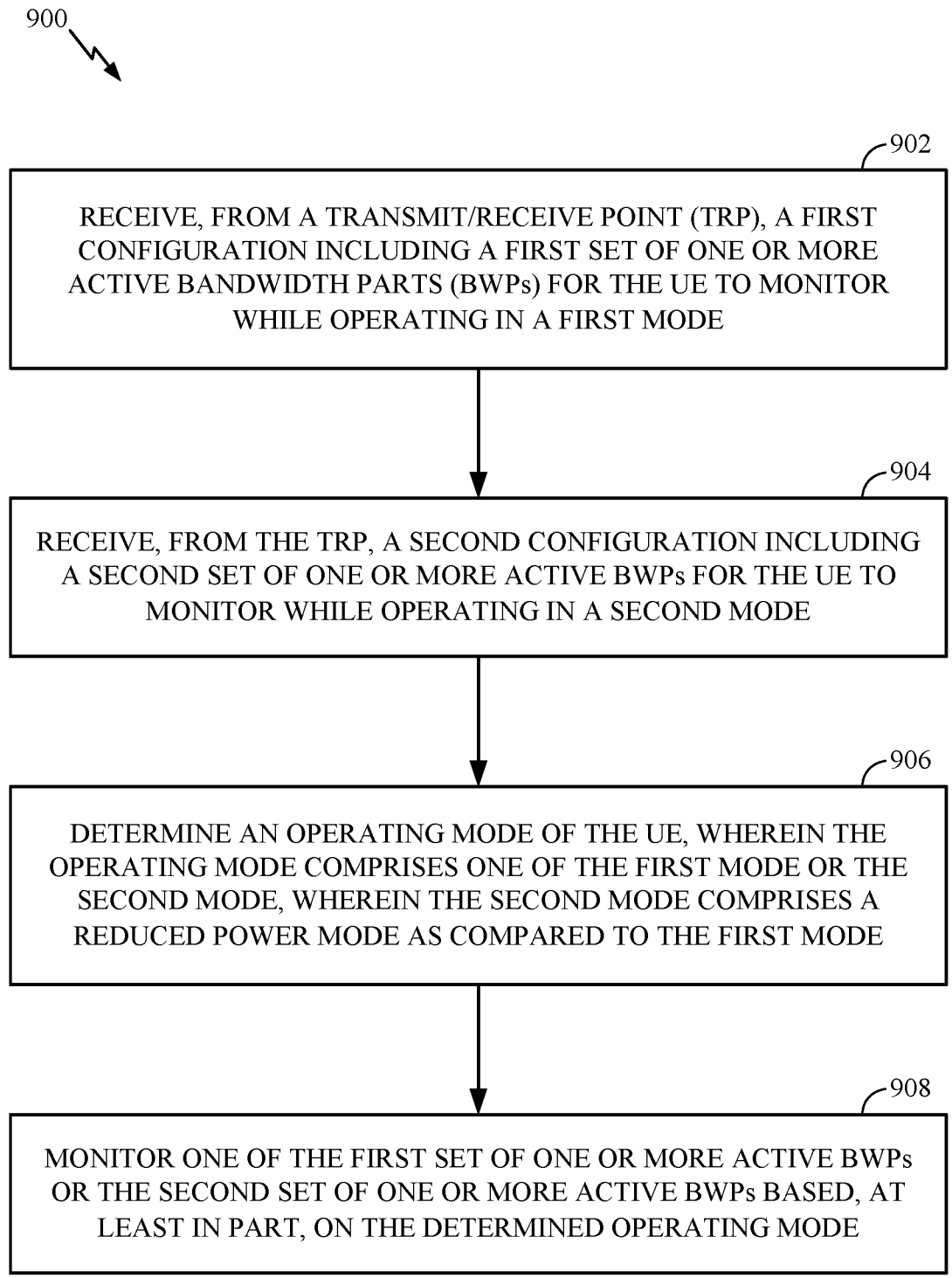
FIG. 9 illustrates example operations performed by a UE, in accordance with certain aspects of the present disclosure.
Figure 11:
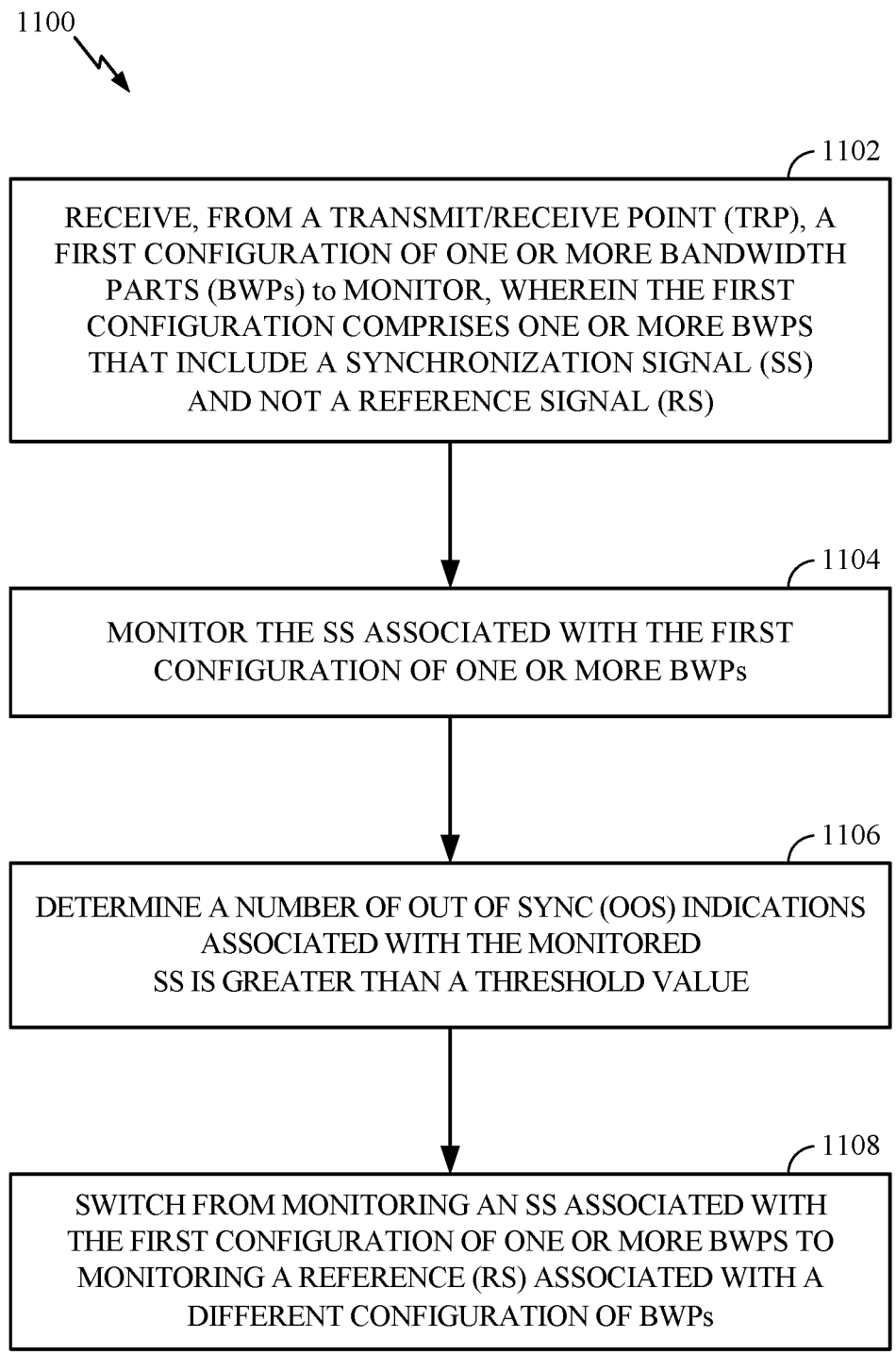
FIG. 11 illustrates example operations performed by a UE, in accordance with certain aspects of the present disclosure.

FIGS. 8, 9, and 11 provides flow diagrams illustrating example operations 800, 900, and 1100 for wireless communication, in accordance with certain aspects of the present disclosure. The operations 800, 900, and/or 1100 may be performed, for example, by UE (e.g., such as a UE 120 in the wireless communication network 100). Operations 800, 900, and/or 1100 may be implemented as software components that are executed and run on one or more processors (e.g., processor 480 of FIG. 4). Further, the transmission and reception of signals by the UE in operations 800 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 800 may begin, at 802, by receiving, from a TRP, a configuration of a set of BWPs for the UE.

In some examples, the UE may be configured with a first set of one or more active BWPs to monitor under first operating conditions (e.g., in a first mode) and a second set of one or more active BWPs to monitor under second operating conditions (e.g., in a second mode that may be reduced power mode as compared to the first mode).

As an example, one or more BWPs may be configured for the first mode (e.g., non-DRX mode) and/or the second mode (e.g., power saving mode, C-DRX). The network may also configure the UE with a set of resource indexes for RLM that are part of the active BWP for the first mode and/or for the second mode. The set of resource indexes may be included in an RLM-RS-List. The resource index may map to (include references for) a CSI-RS or NR-SS (e.g., an SS/PBCH block (SSB)) for the UE to monitor while in the first mode.

The configured BWPs for each of the modes may be transmitted to the UE in advance of operating (e.g., mode) changes. Based on a determined operational mode (e.g., reduced power mode or not), the UE can select and use the configured BWPs for monitoring and transmission. In some examples, the UE may determine that it is operating in a power-saving mode, and the UE may select and monitor the configured BWPs associated with the power-saving mode.

According to aspects, the network may configure quasi-colocated (quasi-colocation, QCL) relationships between signals transmitted in different BWPs. Signals are said to be QCL if they experience similar channel conditions. Therefore, properties of the channel over which a signal is transmitted may be inferred from the properties of the channel over which a QCL signal is transmitted. For example, the network can signal to the UE which transmissions in a BWP are QCL with transmissions in another BWP. In an illustrative example, the UE may be configured to monitor BWP1 for four CSI-RS ports (CSI-RS1 to CSI-RS4) while operating in the first mode and may be configured to monitor BWP2 while operating in the second mode. The UE may receive QCL relations of CSI-RS and NR-SS of BWP2. When the UE transitions to the second mode (e.g., C-DRX), BWP2 becomes active and the UE may switch to monitoring BWP2, based on the received configuration. In an example, the UE may monitor and measure SS Block 1 and SS Block 2 in BWP2, for example, based on an indication that CSI-RS1 and CSI-RS2 in BWP1 are QCL with SS Block 1 in BWP2 and CSI-RS3 and CSI-RS4 are QCL with SS Block 2 in BWP2.

At 804, the UE determines, for a beam failure recovery procedure, to use an active BWP of the set of BWPs or to switch to another BWP of the set of BWPs. And at 806, the UE monitors (e.g., on an active DL BWP) and/or transmits (e.g., on an active UL BWP) on the determined BWP during the beam failure recovery procedure based on the determination.

When a UE determines its operating condition (e.g., mode of operation) has changed (e.g., between first mode to second mode or vice versa), the UE tunes its RF chain to the configured BWP. In this example, a state change at the UE triggers a change in the active BWP.

According to an example, the UE may be in the second mode (e.g., power saving mode). The UE may arrive at the second mode due to a lack of traffic while operating in the first mode. The UE monitors the signals configured in the RML-RS-List for the BWPs associated with the second mode. In this case, the UE monitors the signals configured for the active BWP based on the UE's mode of operation. The network may transmit DL control and/or data (e.g., PDCCH and/or PDSCH) or RS (e.g., CSI-RS and/or tracking reference signal (TRS)) in the BWP configured for the second mode. Because the network knows when the UE transitions to the power saving mode (e.g., the second mode), the network may not transmit any downlink signals or monitor any uplink signals in the BWPs configured for the first mode of UE operation. Thus, the network monitors UL control/data (PUCCH/PUSCH) or RS (SRS) in the BWP configured for the second mode and the UE transmits UL control/data (PUCCH/PUSCH) or RS (SRS) in the BWP configured for the second mode.

According to an aspect, if a UE in the second mode has DL data to receive or has UL data to transmit, the UE transitions from the second mode to the first mode. Therefore, when a UE in C-DRX mode, receives DL control or has PUCCH/PUSCH to transmit, it switches from the configured C-DRX BWP to the configured non-DRX BWP. Thus, the UE tunes its RF from one BWP (configured for first operations, such as C-DRX) to another BWP (configured for other operations, such as non-DRX). For example, in some cases UE can tune to another BWP for a beam failure recovery procedure. The NW monitors UL transmissions in the BWP associated with the first mode. In an aspect, some examples, the UE can tune to an initial DL and/or UL BWP, for example, that supports a random access procedure. For example, the configured one or more BWPs for the UE operating in the power saving mode may be the set of initial-DL-BWP/initial-UL-BWP that support random access procedure.

According to an aspect, a UE may request a change in the active BWP (e.g., when the UE determines to switch BWPs). The UE may be operating in the first mode with active traffic. If, after a certain duration of time (e.g., a period exceeding a threshold duration), the UE does not have active traffic, it may transmit a request to the network to change the active BWP. The request may include a change to any different BWP that contains a NR-SS or synchronization signal.

FIG. 9 illustrates example operations 900 which may be performed by UE, according to aspects of the present disclosure for switching BWPs for operations. At 902, the UE may receive from a TRP, a first configuration including a first set of one or more active BWPs for the UE to monitor while operating in a first mode. At 904, the UE receives, from the TRP, a second configuration including a second set of one or more active BWPs for the UE to monitor while operating in a second mode. At 906, the UE determines an operating mode of the UE. The operating mode may be the first mode or the second mode, and the second mode may be a reduced power mode as compared to the first mode. At 908, the UE monitors one of the first set of one or more active BWPs or the second set of one or more active BWPs based, at least in part, on the determined operating mode.

As described above, the first configuration may include an indication of one or more SSs or RSs to monitor associated with the first set of active BWPs and the second configuration may include an indication of one or more SSs or RSs to monitor associated with the second set of active BWPs. Based on the UE's mode, the UE can monitor one or more of the indicated SSs or RSs in the first or second set of active BWPs.

In an aspect, the UE may receive, from the TRP, an indication of a QCL relationship between one or more SSs or RSs associated with the first set of active BWPs and one or more SSs or RSs associated with the second set of active BWPs.

In an aspect, the UE may determine a change in operating conditions, such a change in operating mode. In response to the determined change, the UE changes (e.g., switch) the one or more monitored BWPs. In some examples, the UE may monitor the active BWPs associated with the determined changed operating mode. Monitoring the active BWPs associated with the determined changed operating mode may include monitoring SSs or RSs QCL with SSs or RSs associated with the active BWP of the changed operating mode.

According to an aspect, the first configuration further comprises a third set of one or more BWPs for uplink transmissions while operating in the first mode and the second configuration further comprises a fourth set of one or more BWPs for uplink transmissions while operating in the second mode. The UE transmits using one of the third set of BWPs or the fourth set of BWPs based, at least in part, on the determined operating mode.

Figure 10:
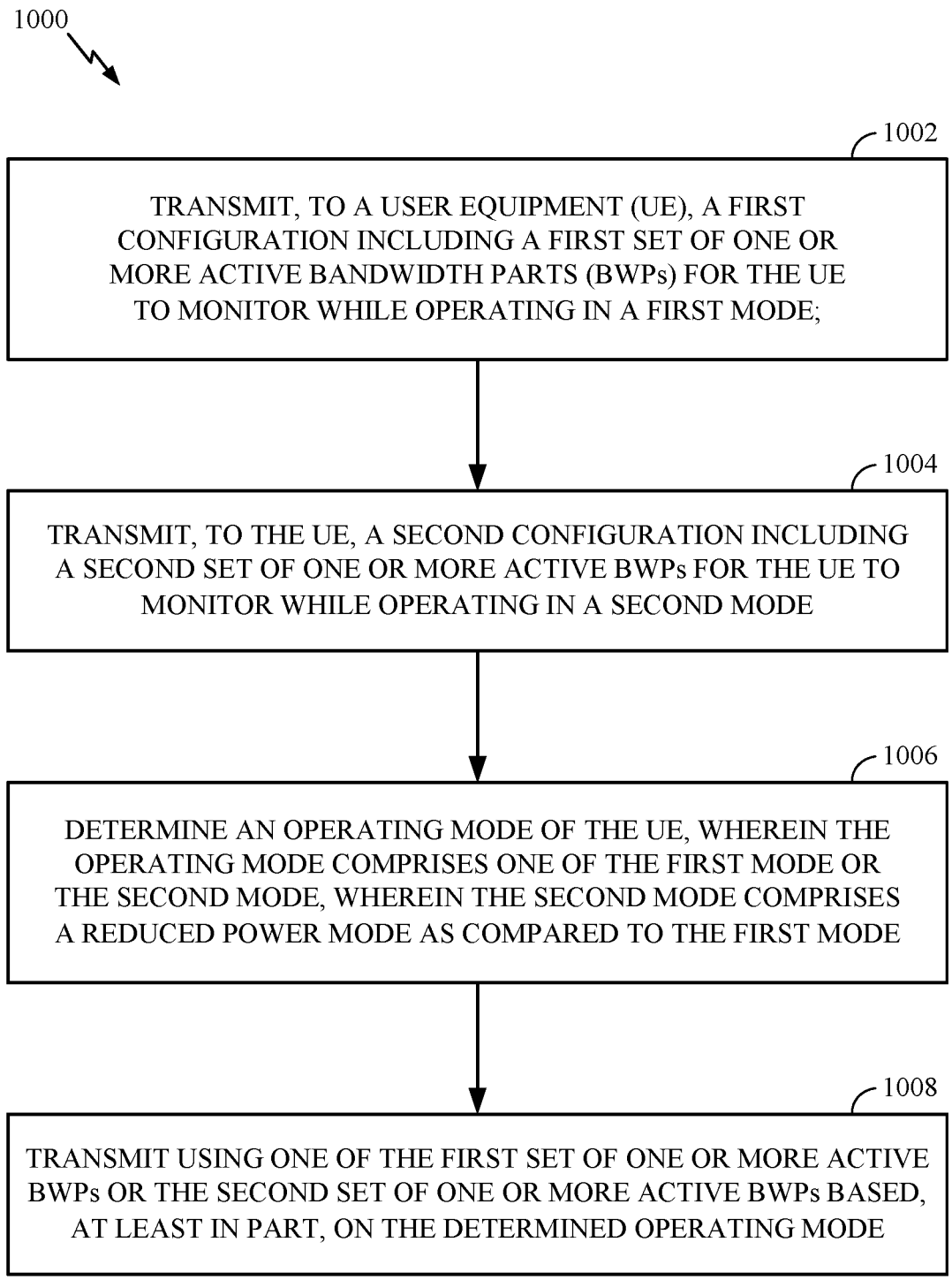
FIG. 10 illustrates example operations performed by a transmit/receive point (TRP), in accordance with certain aspects of the present disclosure.
Figure 12:
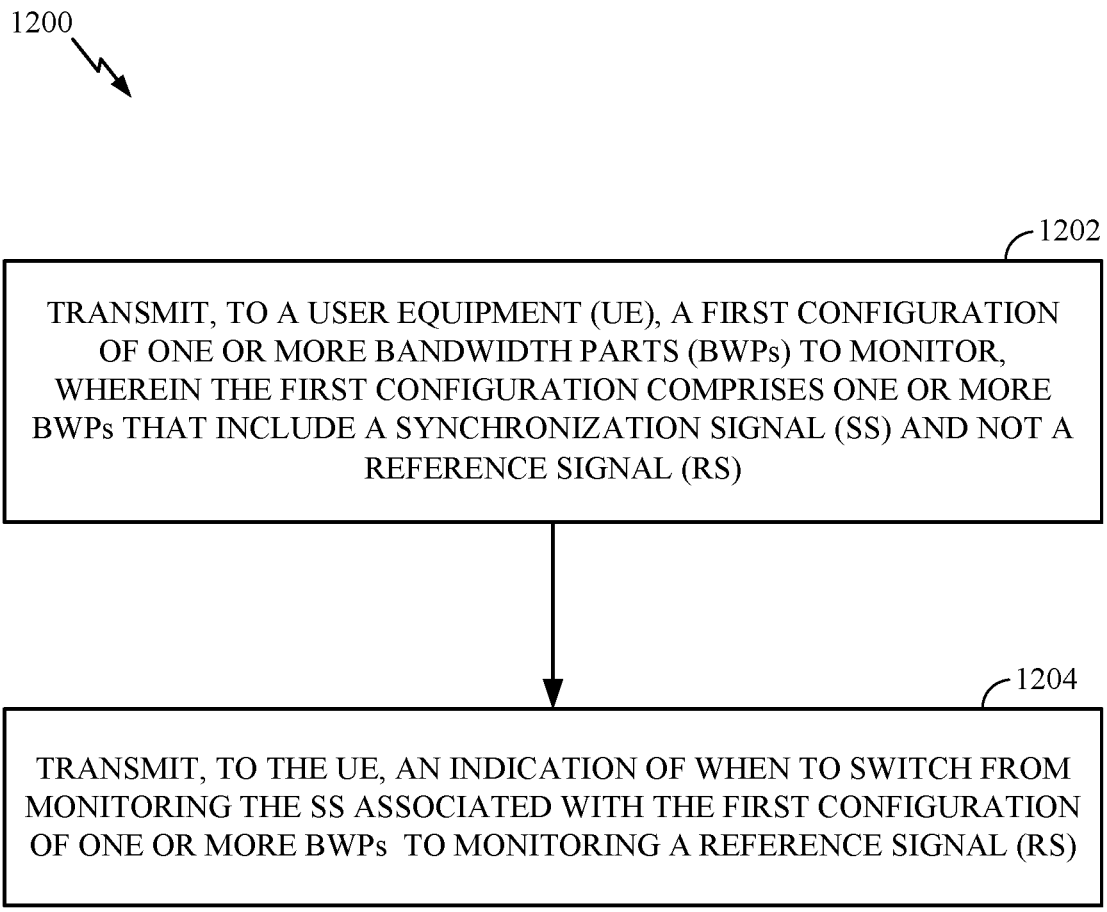
FIG. 12 illustrates example operations performed by a TRP, in accordance with certain aspects of the present disclosure.

FIG. 10 and FIG. 12 illustrate example operations 1000 and 1200 which may be performed by a TRP (e.g., such as BS 110 in the wireless communication network 100 which may be a gNB), according to aspects of the present disclosure. Operations 1000 and/or 1200 may be implemented as software components that are executed and run on one or more processors (e.g., processor 440 of FIG. 4). Further, the transmission and reception of signals by the TRP in operations 1000 and/or 1200 may be enabled, for example, by one or more antennas (e.g., antennas 434 of FIG. 4). In certain aspects, the transmission and/or reception of signals by the TRP may be implemented via a bus interface of one or more processors (e.g., processor 440) obtaining and/or outputting signals.

The operations 1000 by the TRP may be complementary to the operations 900 performed by the UE described with reference to FIG. 9.

At 1002, the TRP transmits, to a UE, a first configuration including a first set of one or more active BWPs for the UE to monitor while operating in a first mode. At 1004, the TRP transmits, to the UE, a second configuration including a second set of one or more active BWPs for the UE to monitor while operating in a second mode. At 1006, the TRP determines an operating mode of the UE. The operating mode may be the first mode or the second mode, and the second mode may be a reduced power mode as compared to the first mode. At 1008, the TRP transmits using one of the first set of one or more active BWPs or the second set of one or more active BWPs based, at least in part, on the determined operating mode.

As described above, the first configuration may include an indication of one or more SSs or RSs to monitor associated with the first set of active BWPs and the second configuration includes an indication of one or more SSs or RSs to monitor associated with the second set of active BWPs. The TRP transmits one or more of the indicated SSs or RSs in the first or second set of active BWPs.

The UE may perform RLM, for example to determine if the UE is in-synch or out-of-synch-with the network. In some examples, the UE may perform the RLM using the active BWP selected based on the determined mode of UE operation.

In some examples, the UE may be configured for operation in BWPs on the DL and the UL. The network, via a TRP, may transmit an indication of the configured BWPs that contain NR-SS only and no CSI-RS; NR-SS and CSI-RS; and/or CSI-RS and no NR-SS. The UE may also receive an indication of QCL relationships between the signals of the different BWPs.

When the UE is operating in a low-power mode, the UE may monitor NR-SS in an active BWP. When the UE observes downlink radio link quality issues, for examples N consecutive OOS indications, the UE may switch to another BWP that contains either NR-SS and CSI-RS or CSI-RS only. The UE may monitor the RLM-RS-List on the new BWP. After switching BWPs, the UE may reset its radio link failure (RLF) timers (e.g., the T310 timer).

Based on the determined mode, the network may monitor the UE using UL BWPs configured for the UE. For example, the network may transmit DL control (e.g., PDCCH), data (e.g., PDSCH), and/or RS on configured active DL BWPs and the network may receive UL transmissions from the UE on configured active UL BWPs.

In some examples, the network may be uncertain of the UE's location. For example, the network may have provided the UE with two configurations of BWPs, one including NR-SS only and another including NR-SS and CSI-RS. The TRP may monitor the UL BWPs associated with each of these configurations in an effort to receive UL transmissions from the UE.

According to certain aspects, the UE may transmit a request to a TRP for a change to an active BWP that includes a CSI-RS, for example, when the UE is currently operating in a configured BWP that does not include CSI-RS. In some examples, if the UE determines a poor radio link between the UE and the TRP based on monitoring NR-SS, the UE may switch BWPs to monitor CSI-RS to more accurately determine radio link conditions.

FIG. 11 illustrates example operations 1100 which may be performed by a UE, according to aspects of the present disclosure. At 1102, the UE receives, from a TRP, a first configuration of one or more BWPs to monitor. The first configuration may have one or more BWPs that include an SS and not an RS. At 1104, the UE may monitor the SS associated with the first configuration of one or more BWPs. At 1106, the UE determines a number of OOS indications associated with the monitored SS is greater than a threshold value. At 1108, the UE switches from monitoring an SS associated with the first configuration of one or more BWPs to monitoring an RS associated with a different configuration of BWPs.

According to an aspect, the different configuration of BWPs comprises one of a second configuration of one or more BWPs that includes an SS and an RS or a third configuration of one or more BWPs that includes an RS and not an SS. The UE may receive the configurations from the TRP. In some examples, the UE receives the threshold value from the TRP. The threshold value may include a number of consecutive OOS indications, or a number of OOS indicates in a defined period of time.

FIG. 12 illustrates example operations 1200 which may be performed by TRP, according to aspects of the present disclosure. The operations 1200 by the TRP may be complementary to the operations 1100 by the UE operations as described with reference to FIG. 11. At 1202, the TRP transmits, to the UE, a first configuration of one or more BWPs to monitor. The first configuration may have one or more BWPs that include an SS and not an RS. At 1204, the TRP transmits, to the UE, an indication of when to switch from monitoring the SS associated with the first configuration of one or more BWPs to monitoring a RS. The RS may be associated with a different BWP.

Thus, as described herein, a UE may perform RLM to determine if the UE is in-synch or out-of-synch-with the network using an active BWP including a CSI-RS in certain scenarios.

While aspects have been described using NR-SS and CSI-RS as example synchronization signals and reference signals respectively, the methods presented herein may apply to any synchronization signal or reference signal that may be used for RLM purposes.

Figure 13:
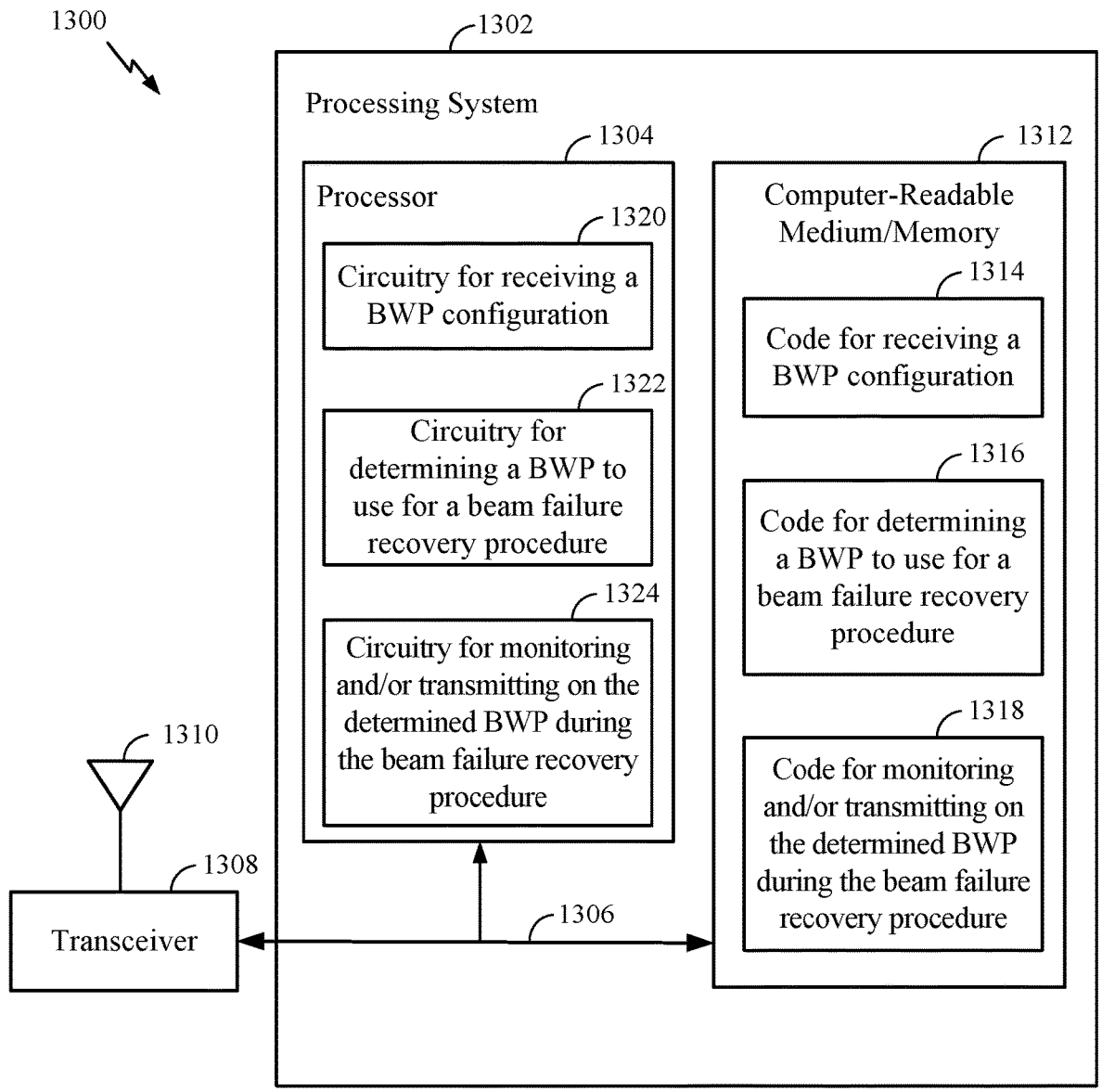
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 8. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 8, or other operations for performing the various techniques discussed herein for BWP switching for operations. In certain aspects, computer-readable medium/memory 1312 stores code 1314 for receiving a BWP configuration; code 1316 for determining a BWP to use for a beam failure recovery procedure; and code 1318 for monitoring and/or transmitting on the determined BWP during the beam failure recovery procedure. In certain aspects, the processor 1004 has circuitry configured to implement the code stored in the computer-readable medium/memory 1312. The processor 1304 includes circuitry 1320 for receiving a BWP configuration; circuitry 1322 for determining a BWP to use for a beam failure recovery procedure; and circuitry 1324 for monitoring and/or transmitting on the determined BWP during the beam failure recovery procedure.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g.,

RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
receiving, from a transmit/receive point (TRP), a configuration of a set of bandwidth parts (BWPs) for the UE;
determining, for a beam failure recovery procedure, to use an active BWP of the set of BWPs or to switch to another BWP of the set of BWPs, wherein the determination is based, at least in part, on whether the UE is in a connected mode discontinuous reception (C-DRX) mode; and
at least one of: monitoring or transmitting on the determined BWP during the beam failure recovery procedure based on the determination.

2. The method of claim 1, further comprising:
determining operating conditions at the UE; and
determining to use the active BWP or to switch to the other BWP based, at least in part, on the determined operating conditions.

3. The method of claim 1, wherein the determination is based, at least in part, on whether the active BWP or other BWP supports a random access procedure.

4. The method of claim 1, further comprising determining presence of downlink control information (DCI) for the UE or uplink transmission by the UE, wherein the determination to use the active BWP or to switch to the other BWP is based, at least in part, on the presence of the DCI or uplink transmission.

5. A method for wireless communication by a user equipment (UE), comprising:
receiving, from a transmit/receive point (TRP), a configuration of a set of bandwidth parts (BWPs) for the UE, wherein the configuration includes an indication of one or more synchronization signals (SSs) or reference signals (RSs) to monitor;
determining, for a beam failure recovery procedure, to use an active BWP of the set of BWPs or to switch to another BWP of the set of BWPs;
at least one of: monitoring or transmitting on the determined BWP during the beam failure recovery procedure based on the determination, wherein the monitoring includes monitoring one or more of the indicated SSs or RSs in the determined BWP;
determining a lack of traffic on the active BWP for a period of time exceeding a threshold value; and
transmitting, to the TRP, a request for a change in active BWP based on the determined lack of traffic.

6. A method for wireless communication by a user equipment (UE), comprising:
receiving, from a transmit/receive point (TRP), a configuration of a set of bandwidth parts (BWPs) for the UE;
receiving an indication of a quasi-collocated (QCL) relationship between one or more synchronization signals (SSs) or reference signals (RSs) associated with the set of BWPs;
determining, for a beam failure recovery procedure, to use an active BWP of the set of BWPs or to switch to another BWP of the set of BWPs; and
at least one of: monitoring or transmitting on the determined BWP during the beam failure recovery procedure based on the determination, wherein the monitoring is based on the QCL relationship.

7. A method for wireless communication by a user equipment (UE), comprising:
receiving, from a transmit/receive point (TRP), a configuration of a set of bandwidth parts (BWPs) for the UE, wherein the configuration includes an indication of one or more synchronization signals (SSs) or reference signals (RSs) to monitor;
determining, for a beam failure recovery procedure, to use an active BWP of the set of BWPs or to switch to another BWP of the set of BWPs;
at least one of: monitoring or transmitting on the determined BWP during the beam failure recovery procedure based on the determination, wherein the monitoring includes monitoring one or more of the indicated SSs or RSs in the determined BWP;
determining a number of out of synchronization (OOS) indications associated with the monitored one or more SSs is greater than a threshold value; and
determination to switch to the other BWP to monitor the one or more RSs.

8. The method of claim 7, wherein the other BWP includes an SS and an RS or includes an RS and not an SS.

9. The method of claim 7, wherein the threshold value comprises a threshold number of consecutive OOS indications.

10. The method of claim 7, further comprising:
receiving, from the TRP, the threshold value.

11. The method of claim 7, further comprising:
after the switching, resetting a radio link failure timer.

12. An apparatus for wireless communication, comprising:
means for receiving, from a transmit/receive point (TRP), a configuration of a set of bandwidth parts (BWPs) for the apparatus;
means for determining, for a beam failure recovery procedure, to use an active BWP of the set of BWPs or to switch to another BWP of the set of BWPs, wherein the determination is based, at least in part, on whether the UE is in a connected mode discontinuous reception (C-DRX) mode; and
means for at least one of: monitoring or transmitting on the determined BWP during the beam failure recovery procedure based on the determination.

13. The apparatus of claim 12, further comprising:
means for determining operating conditions at the apparatus; and
means for determining to use the active BWP or to switch to the other BWP based, at least in part, on the determined operating conditions.

14. The apparatus of claim 12, wherein the determination is based, at least in part, on whether the active BWP or other BWP supports a random access procedure.

15. The apparatus of claim 12, further comprising means for determining presence of downlink control information (DCI) for the apparatus or uplink transmission by the UE, wherein the determination to use the active BWP or to switch to the other BWP is based, at least in part, on the presence of the DCI or uplink transmission.

16. An apparatus for wireless communication, comprising:
   means for receiving, from a transmit/receive point (TRP), a configuration of a set of bandwidth parts (BWPs) for the apparatus;
   means for determining, for a beam failure recovery procedure, to use an active BWP of the set of BWPs or to switch to another BWP of the set of BWPs; and
   means for at least one of: monitoring or transmitting on the determined BWP during the beam failure recovery procedure based on the determination;
   means for determining a lack of traffic on the active BWP for a period of time exceeding a threshold value; and
   means for transmitting, to the TRP, a request for a change in active BWP based on the determined lack of traffic.

17. An apparatus for wireless communication, comprising:
   means for receiving, from a transmit/receive point (TRP), a configuration of a set of bandwidth parts (BWPs) for the apparatus;
   means for receiving an indication of a quasi-collocated (QCL) relationship between one or more synchronization signals (SSs) or reference signals (RSs) associated with the set of BWPs;
   means for determining, for a beam failure recovery procedure, to use an active BWP of the set of BWPs or to switch to another BWP of the set of BWPs; and
   means for at least one of: monitoring or transmitting on the determined BWP during the beam failure recovery procedure based on the determination, wherein the monitoring is based on the QCL relationship.

18. An apparatus for wireless communication, comprising:
   means for receiving, from a transmit/receive point (TRP), a configuration of a set of bandwidth parts (BWPs) for the apparatus, wherein the configuration includes an indication of one or more synchronization signals (SSs) or reference signals (RSs) to monitor;
   means for determining, for a beam failure recovery procedure, to use an active BWP of the set of BWPs or to switch to another BWP of the set of BWPs; and
   means for at least one of: monitoring or transmitting on the determined BWP during the beam failure recovery procedure based on the determination, wherein the monitoring includes monitoring one or more of the indicated SSs or RSs in the determined BWP;
   means for determining a number of out of sync (OOS) indications associated with the monitored one or more SSs is greater than a threshold value; and
   means for determination to switch to the other BWP to monitor the one or more RSs.

19. The apparatus of claim 18, wherein the other BWP includes an SS and an RS or includes an RS and not an SS.

20. The apparatus of claim 18, wherein the threshold value comprises a threshold number of consecutive OOS indications.

21. The apparatus of claim 18, further comprising:
   means for receiving, from the TRP, the threshold value.

22. The apparatus of claim 18, further comprising:
   means for after the switching, resetting a radio link failure timer.

23. An apparatus for wireless communication, comprising:
   a receiver configured to receive, from a transmit/receive point (TRP), a configuration of a set of bandwidth parts (BWPs) for the apparatus;
   at least one processor coupled with a memory and configured to determine, for a beam failure recovery procedure, to use an active BWP of the set of BWPs or to switch to another BWP of the set of BWPs, wherein the determination is based, at least in part, on whether the UE is in a connected mode discontinuous reception (C-DRX) mode; and
   a transceiver configured to at least one of: monitor or transmit on the determined BWP during the beam failure recovery procedure based on the determination.

24. The apparatus of claim 23, wherein the at least one processor is further configured to:
   determine operating conditions at the apparatus; and
   determine to use the active BWP or to switch to the other BWP based, at least in part, on the determined operating conditions.

25. A non-transitory computer readable medium having computer executable code stored thereon for wireless communication, comprising:
   code for receiving, from a transmit/receive point (TRP), a configuration of a set of bandwidth parts (BWPs) for a user equipment (UE);
   code for determining, for a beam failure recovery procedure, to use an active BWP of the set of BWPs or to switch to another BWP of the set of BWPs, wherein the determination is based, at least in part, on whether the UE is in a connected mode discontinuous reception (C-DRX) mode; and
   code for at least one of: monitoring or transmitting on the determined BWP during the beam failure recovery procedure based on the determination.

26. The non-transitory computer readable medium of claim 25, further comprising:
   code for determining operating conditions at the UE; and
   code for determining to use the active BWP or to switch to the other BWP based, at least in part, on the determined operating conditions.

* * * * *